United States Patent [19]

Skoglund

[11] Patent Number: 5,268,850

[45] Date of Patent: Dec. 7, 1993

[54] AUTOMATIC POWER-FAILURE AND AUXILIARY GENERATOR CONTROL

[76] Inventor: Robert A. Skoglund, 1021 Walter St., Lemont, Ill. 60438

[21] Appl. No.: 696,735

[22] Filed: May 7, 1991

[51] Int. Cl.$^5$ .............................................. H02J 9/08
[52] U.S. Cl. ..................... 364/480; 307/43; 307/64; 307/68; 307/85; 307/87; 364/550
[58] Field of Search ................... 307/43, 64, 68, 85, 307/87; 364/480, 550

[56] References Cited

U.S. PATENT DOCUMENTS

| | | | |
|---|---|---|---|
| 3,808,451 | 4/1974 | Pittet | 307/64 |
| 3,949,238 | 4/1976 | Brookes | 307/64 |
| 4,044,268 | 8/1977 | Hammel et al. | 307/66 |
| 4,323,820 | 4/1982 | Teich | 307/66 X |
| 4,675,539 | 6/1987 | Nichol | 307/65 |
| 4,703,191 | 10/1987 | Ferguson | 307/64 |
| 5,191,229 | 3/1993 | Davis et al. | 307/66 |

Primary Examiner—Edward R. Cosimano
Attorney, Agent, or Firm—Charles F. Lind

[57] ABSTRACT

The disclosed emergency control links an auxiliary electrical generator having an auto-start mechanism and an outlet socket, with a utility's power distribution socket, to maintain electrical power at a controlled socket in the event of a utility's power outage. The emergency control has a controlled socket into which the plug of a powered apparatus would be inserted, instead of into the utility's socket; a distribution plug that would be inserted into the utility's socket; and a generator plug that would be inserted into the generator outlet socket. These plug-ins allow use of the control without hard-wiring it into the utility's power lines. The control connects the controlled socket to either the distribution socket or to the generator outlet socket. Detectors sense power at the distribution socket and at the generator outlet socket; and a microprocessor responds to a sensed power outage at the distribution socket to start the auxiliary generator and connect the controlled socket to the generator outlet socket, and responds to restoration of power at the distribution socket to reconnect the controlled socket to the distribution socket and to deactivate the auxiliary power generator.

15 Claims, 4 Drawing Sheets

AUTOMATIC POWER-FAILURE AND AUXILIARY GENERATOR CONTROL

BACKGROUND OF THE INVENTION

Conventional electrical power distribution from the public utility to the end user typically incorporates wall sockets into which mating plugs can be inserted to complete the connection to a powered electrical apparatus. Under normal operations, each distribution socket would be "hot", meaning that electrical power in fact would be at the socket. Power outages at this distribution socket are possible due to many varied reasons; ultimately meaning however that with no electrical power at the socket, the powered apparatus would cease to function.

Because of possible consequences of extended power distribution outages, emergency power generators are quite common. A totally manual emergency power generator system would require an attendant, after the outage started, to start the generator and then switch the electrical connection of the electrical apparatus from the utility's distribution socket to the generator. A totally automatic system would sense when the outage started, and would then start the generator and switch the connection of the electrical apparatus responsive to this outage.

Inasmuch as the cause or timing of extended power distribution outages are not predictable, and having an attendant present to activate a manual system, totally automatic systems are preferred. However, such systems have generally required some form of hard-wiring into the utility's power distribution wiring and/or socket, and consequently, a skilled electrician. Special precautions are needed to preclude the possibility of connecting the generator's output and the utility's distribution lines together.

SUMMARY OF THE INVENTION

This invention relates to a control for linking an auxiliary generator to a powered electrical apparatus, automatically responsive to an extended outage of the utility's power distribution, and more particularly, to such a control that can be installed and made operable without the need for hard-wiring it into the utility's distribution lines and/or socket.

An object of this invention is to provide a self-contained control that can be connected, by conventional push-in plugs, to the utility's electrical power distribution lines and/or socket and to an auxiliary power generator of conventional design, without any hard-wiring of the control relative to either.

Another object of this invention is to provide a self-contained control that will respond automatically to a power outage at the utility's distribution socket to start the auxiliary power generator and effectively switch the electrical connection of the electrical apparatus from the utility's lines and/or socket to the generator's output.

To achieve these and other objects, the present inventive control provides a controlled power socket into which the plug of the powered electrical apparatus would be inserted and electrically connected, a socket plug that would be inserted into the utility's distribution socket, a generator plug that would be inserted into the outlet socket of the auxiliary power generator, and switching means operating to connect the controlled power socket alternatively to either the utility's distribution socket or the auxiliary power generator's outlet. Detectors sense the presence of power at the utility's distribution socket and of the auxiliary power generator; and microprocessor means responds to the detectors for operating the switching means and starting and stopping the auxiliary power generator.

Normally, the switching means connect the controlled socket and the distribution socket together, powering the apparatus plugged into the controlled socket with the utility's power. Upon a sensed sufficiently extended utility power outage, the control initiates automatic starting of the auxiliary power generator and upon generator operation switches the electrical connections of the controlled socket, disconnecting it from the utility's distribution lines and/or socket and connecting it with the auxiliary power generator. The control keeps this connection so long as the utility power outage continues. Upon restoration of the utility power at the distribution socket, the control again switches the electrical connection of the controlled socket, reconnecting it to the utility's distribution lines and/or socket and breaking its connection with the auxiliary power generator. The control further stops the operation of the auxiliary power generator.

The emergency control is effective automatically both during normal distribution and outage conditions of the power utility, and during the operating conditions of the generator, subject to the transition time required to switch between such conditions to keep the controlled socket "hot" and the powered appliance electrically powered.

BRIEF DISCRIPTION OF THE DRAWINGS

Further objects, advantages and features of the present invention will appear from the following disclosure and description, including as a part thereof the accompanying drawings, in which.

DETAILED DESCRIPTION OF AN ILLUSTRATED EMBODIMENT

Figure 1:
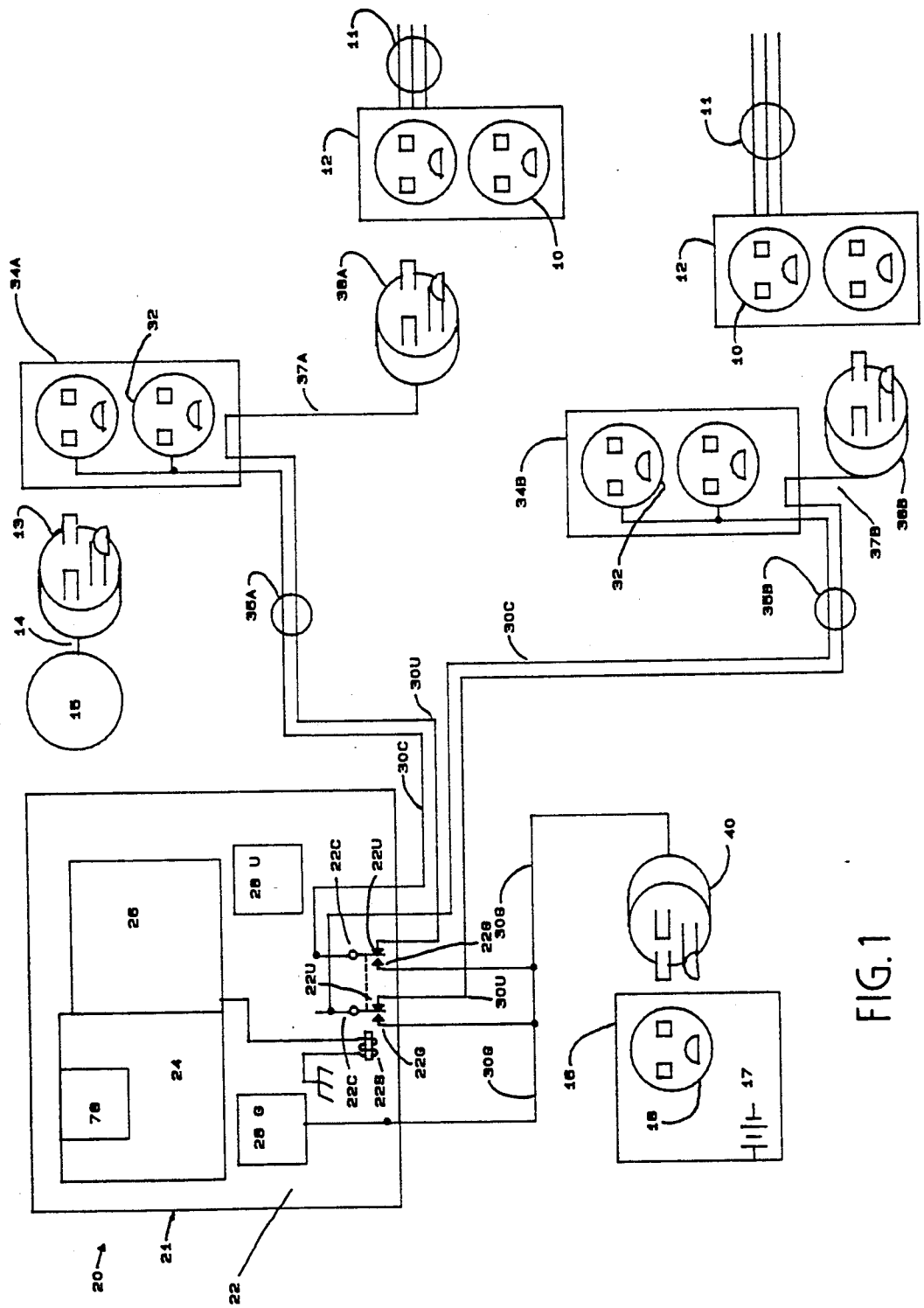
FIG. 1 is a schematic illustration of the automatic emergency control opertatively associated with conventional electrical outlet and/or distribution socket and generator components.

The schematic illustration of FIG. 1 shows two pairs of power distribution sockets 10 of the type conventionally used to distribute the public utility's generated electrical power via three wire grounded conductors 11. Each socket pair 10 would typically be contained in an outlet box 12 mounted in a wall of a house or other structure (neither being shown), and would be of conventional female design suited to become electrically coupled to a mating male plug 13 connected via flexible conductor means 14 with a powered electrical apparatus 15.

A conventional auxiliary electrical generator 16 is also illustrated, having independent battery-powered start mechanism 17 and electrical output sockets 18. Although not illustrated, if the generator 16 were powered by a gasoline or other type internal combustion engine, it would either be located outside of the house or structure holding the distribution sockets 10 or appropriately vented to the outside atmosphere.

The automatic emergency control 20 to be disclosed herein is electrically coupled to the utility's power distribution sockets 10, the powered electrical apparatus 14, and the auxiliary electrical generator 16, effective to power the electrical apparatus 14 automatically should an extended power outage occur at the distribution socket 10.

The emergency control 20 has a housing 21; and switching means 22, microprocessor means 24, relay drive means 26, power detectors 28u and 28g, and other appropriate electrical components are protectively enclosed therein.

The switching means 22 illustrated is for operating two separate socket pairs 10, and thus has a pair of single-pole, double throw devices, operated together by solenoid 22s via the relay drive means 26. Each switch device has a common contact 22c and two alternatively engaged contacts 22u and 22g. Each common contact 22c is connected to conductor means 30c, while the alternate contacts 22u and 22g are connected respectively to the conductor means 30u and 30g.

Although the switching means 22, and the conductor means 30c, 30u and 30g are illustrated as what appears to be single line devices, this is for convenience and simplicy of disclosure only. In practice, normally each line would be conventional two-wire or three-wire conductor means (as illustrated at 11), for carrying the electrical power or the electrical power and a ground, and the switching means would likewise be conventional and suited to fit these needs.

Two paris of controlled electrical power sockets 32 are also provided, each pair being enclosed in a respective junction box 34a and 34b separated from the housing 20. Paired conductor means 30u and 30c are extended as common side-by-side runs 35a and 35b between the housing 21 and the respective junction boxes 34a and 34b. Each conductor means 30c is connected electrically to its controlled power sockets 32, while each conductor means 30u passes through the junction box 34a or 34b without any electrical connection to the controlled socket. The conductor means 30u are further extended beyond the junction boxes 34a and 34b as runs 37a and 37b to be electrically connected to a conventional male power distribution plug 38a and 38b. The conductor means runs 30g are extended from the housing 21 and electrically connected to conventional male plugs 40 of the type used to be releasibly coupled into the outlet sockets 18 of the generator 16.

It may be preferred to use a five-wire flexible conductor means of conventional design in the run 35a and 35b of the conductor means 30u and 30c extended between the housing 21 and the junction boxes 34a and 34b, providing for the separation of the lines 30u and 30c, and for a common ground. A five-wire flexible conductor means of conventional design could also be advantageously used for at least part of the run of the conductor means 30g extended between the housing 21 and the separate plugs 40, and for a common ground.

The conductor means runs 35a and 35b, 37a and 37b and 30g may be of any arbitrary lengths; but on any specific control 20, the respective lengths would typically be fixed. The runs 35a and 35b, 37a and 37b, and 30g further are made flexible to allow free relative movement and positioning of the controlled sockets 32 and plugs 40 relative to the housing 21, and the plugs 38a and 38b relative to the junction boxes 34a and 34b.

When setting up the control 20 for operation, the plug 13 of the powered apparatus 15 would be removed from the utility distribution socket 10 and inserted instead into the controlled socket 32; the utility plug 38a and 38b of the control 10 would be inserted into the distribution sockets 10; and the generator plugs 40 would be inserted into the generator outlet sockets 18. Although only one electrical apparatus 14 has been illustrated, it is apparent that more could be used, up to the fused capacity of the utility's and/or generator's outlet sockets 10 and 18 respectively.

In can be appreciated that all of these connections are achieved merely by using conventional mating male and female plug and/or socket components provided on the control, and specifically without hard-wiring the control 20 into the utility's power distribution lines and/or sockets 10.

Figure 2:
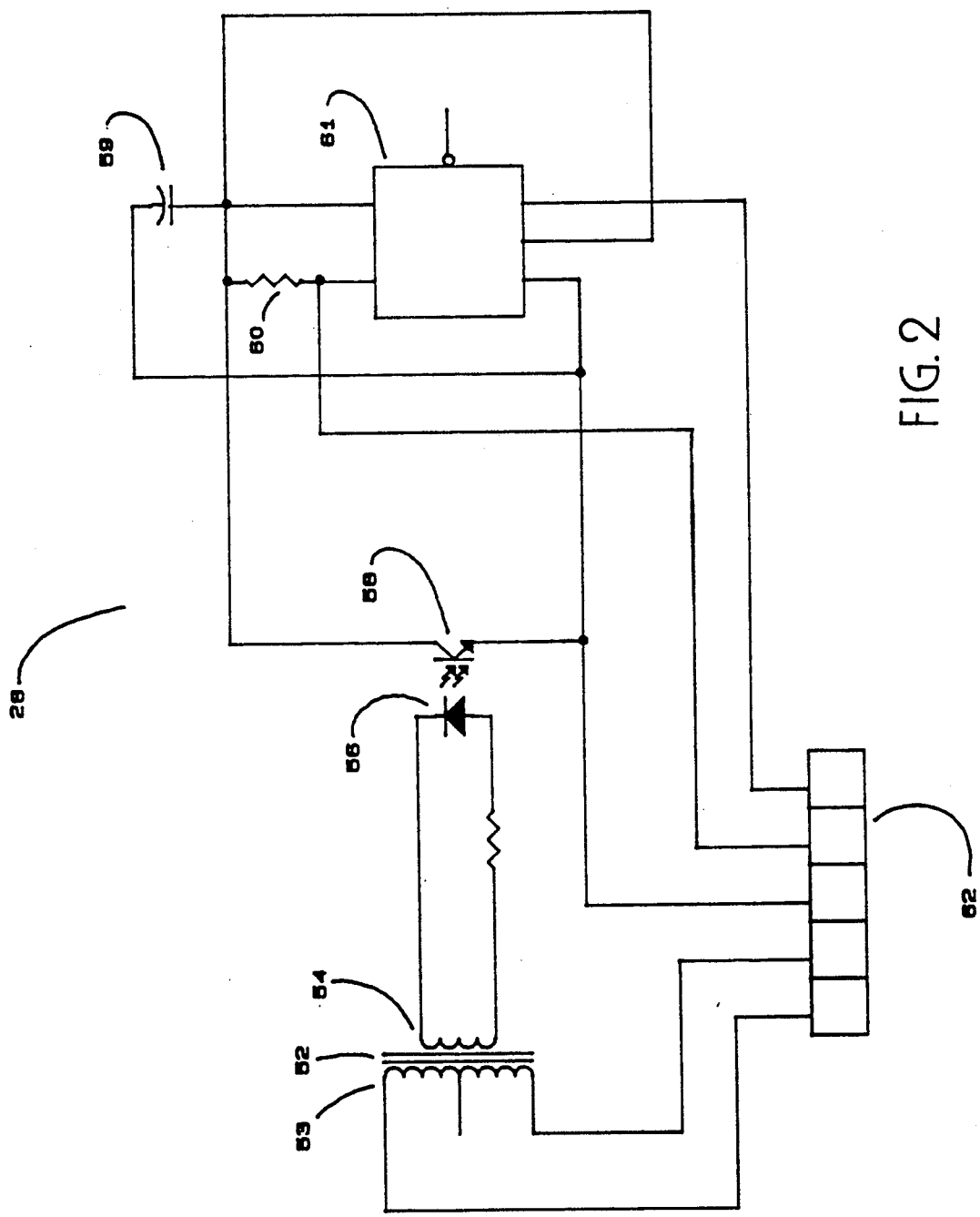
FIG. 2 is a schematic illustration of specific circuit portions used in the automatic emergency control.

FIG. 2 illustrates of a representative detector 28 (either 28g or 28u) suited to determine the presence of operating voltage at the utility's sockets 10 and/or the controlled sockets 32. The illustration includes a stepdown transformer 52 having a 120 volt line side 53 and a 12 volt control side 54, and an infra-red emitting diode 56 is powered off of the low voltage control side 54. If the detector were to be used for the utility power, the 120 volt line side 53 would be connected to the utility distribution voltage; whereas if the detector were to be used for the generator power, the 120 volt line side 53 would be connected to the generator outlet voltage. An optical transistor 58 is associated with the infra-red emitting diode 56, and is connected in a timed decay circuit having capacitor 59, resister 60 and IC chip 61.

Each positive pulse of the alternating power voltage drives the diode 56 to fire the optical transistor 58, and continuous exposure to this sixty cycles per second charging of the timed decay circuit is sufficient to maintain a plus output at line 62 to the microprocessor 24. When this full power voltage is interrupted, the timed decay circuit capacitor 59 discharges and the IC chip 61 provides a zero output at line 62 to the microprocessor 24. Thus, going from plus to zero senses the termination of line power voltage; but the opposite it true too, that is going from a zero to a plus output at line 62 determines the presence of full line power voltage.

Figure 3A:
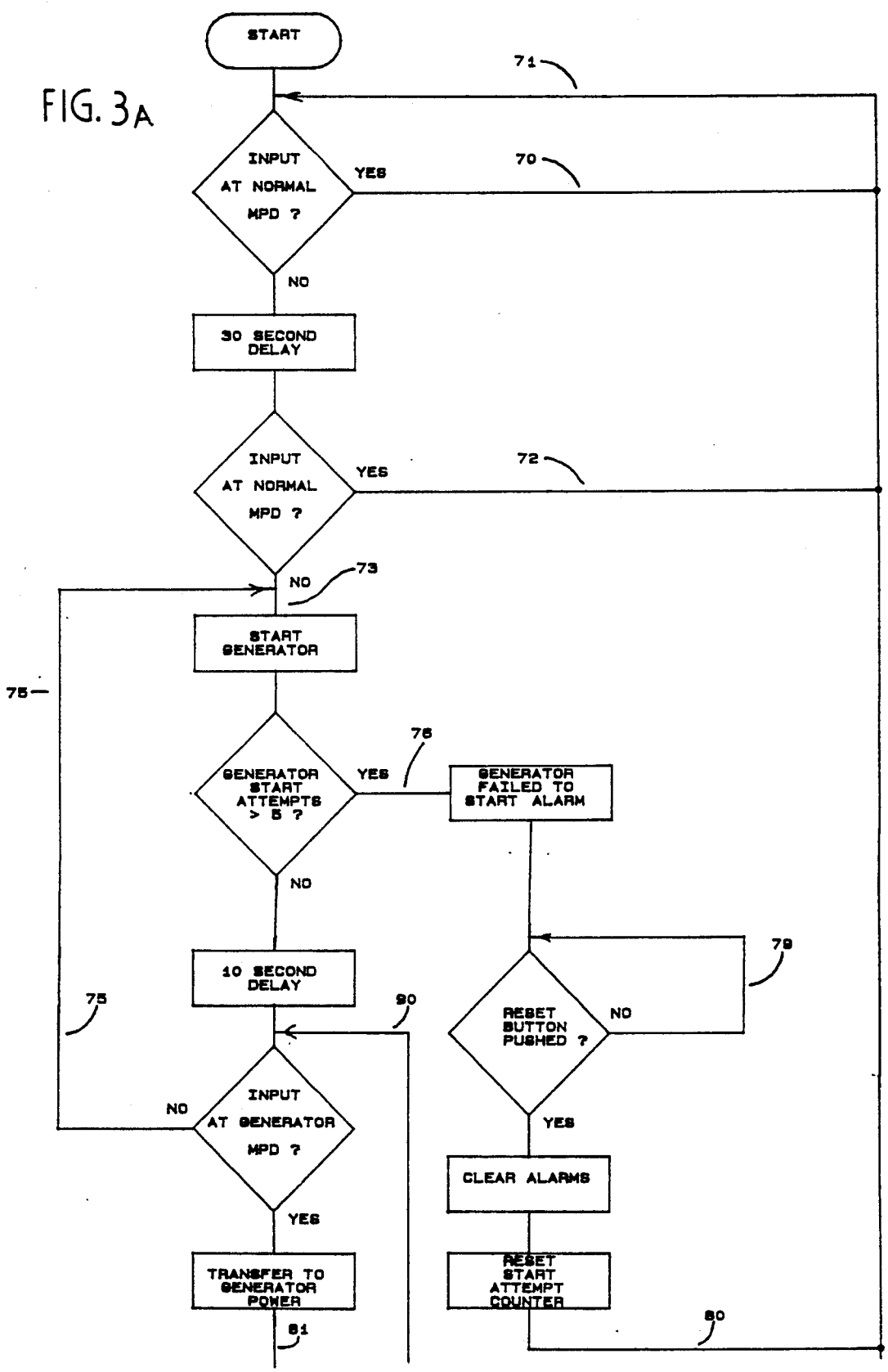
FIGS. 3A and 3B are a flow diagram of the operation of the automatic emergency control.
Figure 3B:
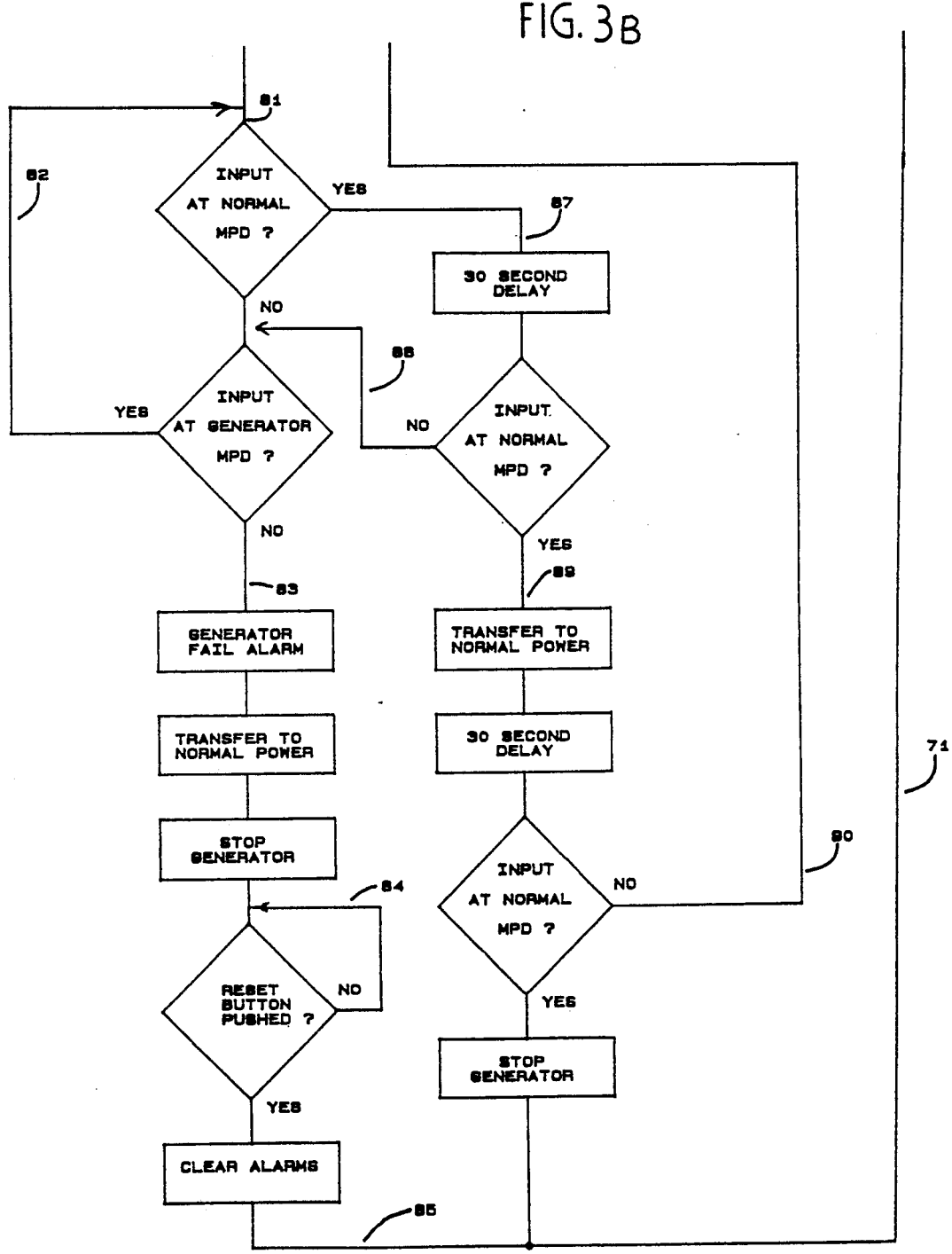

The utility detector 28u remains coupled to the distribution plugs 38a, 38b and thus the utility distribution sockets 10 at all times; while the generator detector 28g remains coupled to the generator plugs 40 and thus the generator output sockets 18 at all times. The microprocessor 24 is set to poll these detectors 28g and 28u on a regular basis, such as possibly several times a second. FIGS. 3A and 3B illustrates a flow diagram of the normal operation of the microprocessor 24 in responding to the resulting detector signals.

SUMMARY OF THE OPERATION

From the start of FIG. 3A, should the utility detector 28u sense the expected or normal full power voltage at the sockets 10, the microprocessor poll loops via lines 70 and 71. This polled microprocessor result allows a deenergized relay drive means 26 and switching means solenoid 22s, and the switching means contacts are positioned as illustrated in FIG. 1. Line voltage at the utility distribution sockets 10 is thus carried by conductor means 30u via runs 37a and 37b, switch contacts 22u and 22c, and conductor means 30c to the controlled sockets 32, applying full utility voltage to these controlled sockets. The appliance 15 plugged into such "hot" controlled sockets 32 could thus be powered.

In the event the polled utility detector 28u senses inadequate or no line voltage at the sockets 10, the microprocessor 24 would wait a brief period before repolling to see if the abnormal reading received was reliable. If the repolled utility detector 28u should now indicate adequate line voltage is in fact available at the sockets 10, the microprocessor poll loops via lines 72 and 71, and the controlled sockets 32 remain "hot" at the full utility voltage. Should the repolled utility detector 28u confirm inadequate or no line voltage at the sockets 10, the microprocessor 24 would initiate generator start procedures at line 73, whereupon generator start means 17 would be activated.

After a short duration, the generator detector 28g is polled to determine if full power is being generated by the generator 16. If generator power is present, the emergency control at line 74 will initiate a shift of the switching means 22; thereby disconnecting the controlled sockets 32 from the utility distribution sockets 10, and connecting the controlled sockets to the generator sockets 18.

In the event the generator 16 did not get timely started and the detector 28g sensed inadequate voltage output, the microprocessor 24 would initiate another generator start procedure via loop 75 to line 73. If after several of these unsuccessful start efforts via loop 75, the microprocessor will respond via line 76 to activate a generator "fail-start" alarm, such as a visual and/or audible device (not shown) on the display panel 78 of the control 20. A reset button is provided to clear the fail-start alarm and reset the starter control via loop 80; but without it being manually depresses the fail-start loop 79 will be repeated and continued. This safety feature would preclude unlimited unsuccessful start efforts of the generator 16, without some manual intervention.

During the period of generator operation at line 81, the detectors 28u and 28g are polled to determine if power is still being generated by the generator 16 and if power has been restored at the utility socket 10.

If generator power continues to be present, the microprocessor signal is carried via loop 82 to line 81. If generator power ceases to be present, the information is carried via line 83: (1) to activate a "generator-fail" alarm (not shown) of an audible and/or visual nature, (2) to transfer the switching means 22 back to the normal operating positions (as illustrated), and (3) to stop the generator 16 via conventional means (not shown). This condition will continue via loop 84 until a manual reset button (not shown) has been activated to clear the generator-fail alarm via loop lines 85 and 71.

If utility power is restored and once again detected by detector 28u, the microprocessor operation via line 87 would wait a brief period before repolling the detector to see if the power has in fact been restored. If the repelled utility detector 28u indicates inadequate or no line power voltage available at the sockets 10, the control would loop via line 88 to the normal generator operating sequence. Should utility power have actually been restored, the microprocessor via line 89 will effectively initiate operation back to normal. This includes shifting the switching means 22 back to the normal operating positions (as illustrated), and after a delay and making another check that the utility detector 28u still is detecting normal line power of stopping the generator 16.

In the event utility power in fact does not continue to be available at the sockets 10 after a short waiting duration, this information will be carried via loop 90 to the generator post-start but still checking generator output loop 75.

As will be appreciated, this control 20 effectively maintains a controlled socket 32 "hot" even in the event of power outage at the utility's power distribution sockets 10 subject to the transition time required to switch between and power outage but generally operating conditions); and this reliable emergency take-over control can be achieved merely by using conventional mating male and female plug and/or socket coupling components, without hard-wiring the control into the utility's electrical power distribution lines.

The housing 21 may be free-standing, with the flexible conductor runs radiating therefrom. One arrangement may have the conductor runs 30g, 37a and 37b of possibly between two and ten feet; while the conductor runs 35a and 35b amy be between five and fifty feet. This might allow placement of the generator 16 outside of controlled house (not shown) with the conductor run 30g being extended through a wall or window of the house to the control housing 21 located therewithin, and provide a wide selection of suitable locations for the controlled sockets 34 and sensed distribution socket 38.

Another arrangement may have the housing 21 free-standing but intended to be proximate or even clipped onto the generator, whereupon conductor run 30g could be short, possibly only a foot or two; while the conductor runs 35a and 35b could be between five and fifty feet, while the conductor runs 37a and 37b may be between two and ten feet. Yet another arrangement may have the housing 21 proximate or even part of the junction box 34a or 34b, whereupon conductor run 30g could be long, possibly between five and fifty feet, while the conductor runs 35a and 35b may be less than a foot, and conductor runs 37a and 37b may be between two and ten feet.

Accordingly, the invention is to be limited only by the scope of the following claims.

What is claimed as my invention is:

1. For use with a normally hot electrical power distribution socket, an auxiliary electrical generator having start means and an outlet socket means, and an electrical apparatus having a plug suited to be releasibly inserted into either the socket or socket means, an automatic emergency control comprising the combination of:

a controlled socket into which the appliance plug would be releasibly inserted, instead of into either the distribution socket or generator outlet socket means;

a distribution plug that would be inserted into the distribution socket;

a generator plug that would be releasibly inserted into the generator outlet socket means; and switching means and hard-wired conductor means operable to connect the controlled socket alternatively to either the distribution plug and thus the distribution socket or to the generator plug and thus the generator outlet socket means; detectors operable respectively to sense power at the distribution socket and at the generator outlet socket means; and microprocessor means responsive to a power outage at the distribution socket to activate the start means for initiating operation of the auxiliary generator and thereupon to shift the switching means to connect the controlled socket to the generator outlet socket means, and responsive to power at the distribution socket to shift the switching means to connect the controlled socket to the distribution socket and to deactivate the auxiliary power generator, said automatic emergency control being portable and freely moved and made operable where needed by connecting the appliance plug to the controlled socket, the distribution plug to the distribution socket, and the generator plug to the generator outlet socket, as noted above.

2. An emergency control according to claim 1, further comprising a housing for the switching means, the microprocessor means, and detectors; and said hard-wired conductor means including first conductor means electrically connecting the switching means and the controlled socket, second conductor means extended between the housing and the generator plug and electrically connecting the switching means and the generator plug, and yet other conductor means extended between the housing and the distribution plug and electrically connecting the switching means and the distribution plug, and said second and other conductor means being flexible and providing free relative movement and positioning of the generator and distribution plugs and the controlled socket and the emergency control housing.

3. An emergency control according to claim 1, further comprising a housing for the switching means, the microprocessor means, and detectors; a junction box for holding the controlled socket; and said hard-wired conductor means including first and other conductor means being extended as a side-by-side but electrically separated run between the switching means and the junction box, said first conductor means electrically connecting the switching means and the controlled socket and said other conductor means having no electrical connection in the junction box to the controlled socket and electrically connecting the switching means and the distribution plug, and said second and other conductor means being flexible and providing free relative movement and positioning of the junction box and the emergency control housing.

4. An emergency control according to claim 1, further comprising a housing for the switching means, the microprocessor means, and detectors; a junction box for holding the controlled socket; and said hard-wired conductor means including first conductor means electrically connecting the switching means and the controlled socket, second conductor means extended between the housing and the generator plug and electrically connecting the switching means and the generator plug, and other conductor means electrically connecting the switching means and the distribution plug, the first and other conductor means being extended as a side-by-side but electrically separated run between the switching means and the junction box, and said other conductor means having no electrical connection in the junction box to the controlled socket and being extended beyond the junction box to the distribution plug, and said first, second and other conductor means being flexible and providing free relative movement and positioning of the junction box and controlled socket, the distribution and generator plugs, and the emergency control housing.

5. An emergency control according to claim 4, further comprising the second conductor means extended between the housing and the generator plug being of length between five and fifty feet, and the other conductor means extended beyond the junction box to the distribution plug being of length between two and ten feet.

6. An emergency control according to claim 4, further comprising the side-by-side electrically separated run of the first and other conductor means extended between the housing and junction box being of length between five and fifty feet.

7. An emergency control according to claim 6, further comprising the second conductor means extended between the housing and the generator plug and the other conductor means extended beyond the junction box and distribution plug each being of length between two and ten feet.

8. An emergency control according to claim 1, further comprising a housing for the switching means, the microprocessor means, and detectors; and said hard-wired conductor means comprising first flexible conductor means extended between the housing and the controlled socket and electrically connecting the switching means and the controlled socket, and providing free relative movement and positioning of the controlled socket and the emergency control housing.

9. An emergency control according to claim 8, further comprising said hard-wired conductor means comprising second flexible conductor means extended between the housing and the generator plug and electrically connecting the switching means and the generator plug, and providing free relative movement and positioning of the generator plug, the controlled socket and emergency control housing.

10. An emergency control according to claim 8, further comprising said hard-wired conductor means comprising yet other flexible conductor means extended between the housing and the distribution plug and electrically connecting the switching means and the distribution plug, providing free relative movement and positioning of the distribution plug and the emergency control housing.

11. An emergency control according to claim 10, further comprising a junction box for holding the controlled socket, said first and other flexible conductor means each being extended between the housing and the junction box.

12. An emergency control according to claim 11, further comprising said other flexible conductor means having no electrical connection in the junction box to the controlled socket and being extended beyond the junction box to the distribution plug, providing free relative movement and positioning of the distribution plug and junction box.

13. An emergency control according to claim 8, further comprising said hard-wired conductor means comprising second flexible conductor means extended between the housing and the generator plug and electrically connecting the switching means and the generator plug, and said hard-wired conductor means further comprising yet other flexible conductor means extended between the housing and the distribution plug and electrically connecting the switching means and the distribution plug, providing free relative movement and positioning of the generator and distribution plugs and the emergency control housing.

14. An emergency control according to claim 13, further comprising a junction box for holding the controlled socket, and said first and other flexible conductor means being extended as a side-by-side but electrically separated run between the housing and the junction box.

15. An emergency control according to claim 14, further comprising said other flexible conductor means having no electrical connection in the junction box to the controlled socket and being extended beyond the junction box to the distribution plug, providing free relative movement and positioning of the distribution plug and junction box.

* * * * *